(12) United States Patent
Crabtree et al.

(10) Patent No.: US 11,494,665 B2
(45) Date of Patent: Nov. 8, 2022

(54) MULTI-TENANT KNOWLEDGE GRAPH DATABASES WITH DYNAMIC SPECIFICATION AND ENFORCEMENT OF ONTOLOGICAL DATA MODELS

(71) Applicant: QOMPLX, Inc., Reston, VA (US)

(72) Inventors: Jason Crabtree, Vienna, VA (US);
Andrew Sellers, Monument, CO (US);
Randy Clayton, Frederick, MD (US);
Angad Salaria, Herndon, VA (US);
Antony Pegg, Petersburg, PA (US);
Bhashit Parikh, Reston, VA (US);
Luka Jurukovski, Arlington, VA (US);
Stuart Baurmann, Austin, TX (US);
Paolo Angioletti, Sutton (GB)

(73) Assignee: QOMPLX, INC., Tysons, VA (US)

( * ) Notice: Subject to any disclaimer, the term of this patent is extended or adjusted under 35 U.S.C. 154(b) by 83 days.

(21) Appl. No.: 16/864,133

(22) Filed: Apr. 30, 2020

(65) Prior Publication Data
US 2020/0364584 A1 Nov. 19, 2020

Related U.S. Application Data

(63) Continuation-in-part of application No. 15/847,443, filed on Dec. 19, 2017, now abandoned, which is a
(Continued)

(51) Int. Cl.
*G06N 5/02* (2006.01)
*G06K 9/62* (2022.01)
(Continued)

(52) U.S. Cl.
CPC ........... *G06N 5/02* (2013.01); *G06F 16/2272* (2019.01); *G06F 16/2458* (2019.01); *G06F 16/284* (2019.01); *G06K 9/6296* (2013.01)

(58) Field of Classification Search
CPC ...... G06N 5/02; G06N 5/022; G06F 16/2272; G06F 16/2458; G06F 16/284; G06F 16/9024; G06K 9/6296
See application file for complete search history.

(56) References Cited

U.S. PATENT DOCUMENTS 6,256,544 B1 7/2001 Weissinger
8,407,242 B2 * 3/2013 Jackson .............. G06F 16/2477
707/769
(Continued)

FOREIGN PATENT DOCUMENTS

CN 102253933 A 11/2011
WO 2011011942 A1 2/2011
(Continued)

*Primary Examiner* — Alford W Kindred
*Assistant Examiner* — Cao D Vuong
(74) *Attorney, Agent, or Firm* — Galvin Patent Law LLC; Brian R. Galvin

(57) ABSTRACT

A system and method for a high-performance, scalable, multi-tenant, dynamically specifiable, knowledge graph information storage and utilization. The system uses an in-memory associative array for high-performance graph storage and access, with a non-volatile distributed database for scalable backup storage, a scalable, distributed graph service for graph creation, an indexing search engine to increase searching performance, and a graph crawler for graph traversal. One or more of these components may be in the form of a cloud-based service, and in some embodiments the cloud-based services may be containerized to allow for multi-tenant co-existence with no possibility of data leakage or cross-over.

19 Claims, 12 Drawing Sheets

Related U.S. Application Data continuation-in-part of application No. 15/790,457, filed on Oct. 23, 2017, now Pat. No. 10,884,999, and a continuation-in-part of application No. 15/790,327, filed on Oct. 23, 2017, now Pat. No. 10,860,951, and a continuation-in-part of application No. 15/616,427, filed on Jun. 7, 2017, now abandoned, and a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, application No. 16/864,133, which is a continuation-in-part of application No. 15/847,443, filed on Dec. 19, 2017, now abandoned, which is a continuation-in-part of application No. 15/616,427, filed on Jun. 7, 2017, now abandoned, which is a continuation-in-part of application No. 14/925,974, filed on Oct. 28, 2015, now abandoned, application No. 16/864,133, which is a continuation-in-part of application No. 15/847,443, filed on Dec. 19, 2017, now abandoned, which is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, which is a continuation-in-part of application No. 15/141,752, filed on Apr. 28, 2016, now Pat. No. 10,860,962.

(60) Provisional application No. 62/568,298, filed on Oct. 4, 2017, provisional application No. 62/568,291, filed on Oct. 4, 2017.

(51) Int. Cl.
*G06F 16/28* (2019.01)
*G06F 16/22* (2019.01)
*G06F 16/2458* (2019.01)

(56) References Cited

U.S. PATENT DOCUMENTS

| | | | | |
|---|---|---|---|---|
| 9,535,902 | B1* | 1/2017 | Michalak | G06F 40/30 |
| 2007/0012161 | A1 | 1/2007 | Lyles | |
| 2008/0172353 | A1 | 7/2008 | Lim et al. | |
| 2010/0153369 | A1* | 6/2010 | Peoples | G06F 16/36 |
| | | | | 707/E17.014 |
| 2010/0228693 | A1 | 9/2010 | Dawson et al. | |
| 2010/0318537 | A1* | 12/2010 | Surendran | G06F 16/36 |
| | | | | 707/759 |
| 2011/0040776 | A1* | 2/2011 | Najm | G06F 16/3326 |
| | | | | 707/766 |
| 2013/0041921 | A1 | 2/2013 | Cooper et al. | |
| 2013/0117202 | A1* | 5/2013 | Malka | G06F 16/215 |
| | | | | 706/12 |
| 2013/0346354 | A1* | 12/2013 | Mizell | G06N 5/025 |
| | | | | 706/47 |
| 2014/0040975 | A1 | 2/2014 | Raleigh et al. | |
| 2014/0074826 | A1 | 3/2014 | Cooper et al. | |
| 2014/0337306 | A1* | 11/2014 | Gramatica | G06F 16/2471 |
| | | | | 707/706 |
| 2016/0063106 | A1* | 3/2016 | Chai | G06F 16/9024 |
| | | | | 707/E17.014 |
| 2016/0275123 | A1 | 9/2016 | Lin et al. | |

FOREIGN PATENT DOCUMENTS

| | | | |
|---|---|---|---|
| WO | 2014159150 | A1 | 10/2014 |
| WO | 2017075543 | A1 | 5/2017 |

* cited by examiner

MULTI-TENANT KNOWLEDGE GRAPH DATABASES WITH DYNAMIC SPECIFICATION AND ENFORCEMENT OF ONTOLOGICAL DATA MODELS

CROSS-REFERENCE TO RELATED APPLICATIONS

| Application No. | Date Filed | Title |
|---|---|---|
| Current application | Herewith | MULTI-TENANT KNOWLEDGE GRAPH DATABASES WITH DYNAMIC SPECIFICATION AND ENFORCEMENT OF ONTOLOGICAL DATA MODELS |
| | | Is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING |
| | | which is a continuation-in-part of: |
| 15/790,457 | Oct. 23, 2017 | DISTRIBUTABLE MODEL WITH BIASES CONTAINED WITHIN DISTRIBUTED DATA |
| | | which claims benefit of, and priority to: |
| 62/568,298 | Oct. 4, 2017 | DISTRIBUTABLE MODEL WITH BIASES CONTAINED IN DISTRIBUTED DATA |
| | | and is also a continuation-in-part of: |
| 15/790,327 | Oct. 23, 2017 | DISTRIBUTABLE MODEL WITH DISTRIBUTED DATA |
| | | which claims benefit of, and priority to: |
| 62/568,291 | Oct. 4, 2017 | DISTRIBUTABLE MODEL WITH DISTRIBUTED DATA |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 Patent 10/204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 Patent 10/210,255 | Dec. 31, 2015 Issue Date Feb. 19, 2019 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | MULTI-TENANT KNOWLEDGE GRAPH DATABASES WITH DYNAMIC SPECIFICATION AND ENFORCEMENT OF ONTOLOGICAL DATA MODELS |
| | | Is a continuation-in-part of: |
| 15/847,443 | Dec. 19, 2017 | SYSTEM AND METHOD FOR AUTOMATIC CREATION OF ONTOLOGICAL DATABASES AND SEMANTIC SEARCHING |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | MULTI-TENANT KNOWLEDGE GRAPH DATABASES WITH DYNAMIC SPECIFICATION AND ENFORCEMENT OF ONTOLOGICAL DATA MODELS |
| | | Is a continuation-in-part of: |
| 15/847,443 | Dec. 19, 2017 | SYSTEM AND METHOD FOR AUTOMATIC CREATION OF ONTOLOGICAL |

-continued

| Application No. | Date Filed | Title |
|---|---|---|
| | | DATABASES AND SEMANTIC SEARCHING |
| | | which is a continuation-in-part of: |
| 15/489,716 | Apr. 17, 2017 | REGULATION BASED SWITCHING SYSTEM FOR ELECTRONIC MESSAGE ROUTING |
| | | which is a continuation-in-part of: |
| 15/409,510 | Jan. 18, 2017 | MULTI-CORPORATION VENTURE PLAN VALIDATION EMPLOYING AN ADVANCED DECISION PLATFORM |
| | | which is a continuation-in-part of: |
| 15/379,899 | Dec. 15, 2016 | INCLUSION OF TIME SERIES GEOSPATIAL MARKERS IN ANALYSES EMPLOYING AN ADVANCED CYBER-DECISION PLATFORM |
| | | which is a continuation-in-part of: |
| 15/376,657 Patent 10/402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM |
| | | which is a continuation-in-part of: |
| 15/237,625 | Aug. 15, 2016 | DETECTION MITIGATION AND REMEDIATION OF CYBERATTACKS EMPLOYING AN ADVANCED CYBER-DECISION PLATFORM |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY |
| | | which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION | the entire specification of each of which is incorporated herein by reference.

BACKGROUND OF THE INVENTION

Field of the Invention

The present invention is in the field of computer systems and algorithms for context-based searching and complex knowledge data set development.

Discussion of the State of the Art

It is increasingly the case that the data of organizations (businesses, governments, etc.) is exceeding the ability of those organizations to classify, store, search, manage, and utilize the data. There is so much information available even in mid-sized organizations that much data becomes lost, inaccessible, or simply stored away with no effective means of utilizing it. This inability to utilize such large datasets within an organization represents an enormous lost potential. Knowledge graphs represent a potential means organizing this mass of data and making it accessible and usable, but no system or method exists which incorporates all of the elements necessary to make the process practical for a given organization, much less providing a high-performance, scalable system suitable for providing such a service to multiple clients simultaneously.

What is needed is a system and method for a high-performance, scalable, multi-tenant, dynamically specifiable, knowledge graph based information storage and utilization.

SUMMARY OF THE INVENTION

The inventor has developed, and reduced to practice, a system and method for a high-performance, scalable, multi-tenant, dynamically specifiable, knowledge graph information storage and utilization. The system uses an in-memory associative array for high-performance graph storage and access, with a non-volatile distributed database for scalable backup storage, a scalable, distributed graph service for graph creation, an indexing search engine to increase searching performance, and a graph crawler for graph traversal. One or more of these components may be in the form of a cloud-based service, and in some embodiments the cloud-based services may be containerized to allow for multi-tenant co-existence with no possibility of data leakage or cross-over.

According to a preferred embodiment, a system for system for high-performance, dynamically specifiable, knowledge graph information storage and utilization is disclosed, comprising: a computing device comprising a processor and a memory; an in-memory associative array comprising key-value pairs stored in the memory of the computing device and configured to represent a knowledge graph; an integration platform comprising a first plurality of programming instructions stored in the memory of, and operating on the processor of, the computing device, wherein the first plurality of programming instructions, when operating on the processor, cause the computing device to: receive a schema, the schema comprising an ontological abstraction of data; compile the schema into data types, each data type comprising an entity definition, one or more link definitions, and one or more attribute definitions; send the compiled schema to a knowledge graph engine; receive one or more data clumps, each data clump comprising entity, link, and attribute data; determine whether each data clump complies with the ontological abstraction of data; enforce compliance of each data clump by atomically accepting compliant data clumps and atomically rejecting non-compliant data clumps; send the compliant data clumps to the knowledge graph engine; receive a query, the query comprising an operation to be performed on the knowledge graph; perform the operation requested by the query; and return a result of the query; a knowledge graph engine comprising a second plurality of programming instructions stored in the memory of, and operating on the processor of, the computing device, wherein the second plurality of programming instructions, when operating on the processor, cause the computing device to: receive a compiled schema from an integration platform; instantiate a knowledge graph in an in-memory associative array; receive compliant data clumps from the integration platform; and populate the knowledge graph in the in-memory associative array with the entity, link, and attribute data in each data clump.

According to another preferred embodiment, a system for system for high-performance, scalable, multi-tenant, dynamically specifiable, knowledge graph based information storage and utilization is disclosed, comprising: a computing device comprising a processor and a memory; a distributed in-memory associative array comprising key-value pairs stored in the memory of a plurality of networked computing devices and configured to represent a knowledge graph; an integration platform comprising a first plurality of programming instructions stored in the memory of, and operating on the processor of, the computing device, wherein the first plurality of programming instructions, when operating on the processor, cause the computing device to: receive a schema, the schema comprising an ontological abstraction of data; compile the schema into data types, each data type comprising an entity definition, one or more link definitions, and one or more attribute definitions; send the compiled schema to a cloud-based knowledge graph service, wherein the cloud-based knowledge graph service: receives the compiled schema from an integration platform; instantiates a knowledge graph; retrieve the knowledge graph from the knowledge graph service and implement the knowledge graph in the distributed in-memory associative array; receive one or more data clumps, each data clump comprising entity, link, and attribute data; determine whether each data clump complies with the ontological abstraction of data; enforce compliance of each data clump by atomically accepting compliant data clumps and atomically rejecting non-compliant data clumps; send each compliant data clump to the cloud-based knowledge graph service, wherein the cloud-based knowledge graph service: receives compliant data clumps from the integration platform; and populates the knowledge graph in the distributed in-memory associative array with the entity, link, and attribute data in each data clump; retrieve the populated knowledge graph from the knowledge graph service and update the distributed in-memory associative array with the populated knowledge graph; receive a query, the query comprising an operation to be performed on the knowledge graph; perform the operation requested by the query on the knowledge graph in the distributed in-memory associative array; and return a result of the query.

According to another preferred embodiment, a method for system for high-performance, scalable, multi-tenant, dynamically specifiable, knowledge graph based information storage and utilization is disclosed, comprising the steps of: instantiating a distributed in-memory associative array comprising key-value pairs stored in the memory of a plurality of networked computing devices and configured to represent a knowledge graph; receiving a schema, the schema comprising an ontological abstraction of data; compiling the schema into data types, each data type comprising an entity definition, one or more link definitions, and one or more attribute definitions; sending the compiled schema to a cloud-based knowledge graph service, wherein the cloud-based knowledge graph service: receives the compiled schema from an integration platform; and instantiates a knowledge graph; retrieving the knowledge graph from the knowledge graph service and implementing the knowledge graph in the distributed in-memory associative array; receiving one or more data clumps, each data clump comprising entity, link, and attribute data; determining whether each data clump complies with the ontological abstraction of data; enforcing compliance of each data clump by atomically accepting compliant data clumps and atomically rejecting non-compliant data clumps; sending each compliant data clump to the cloud-based knowledge graph service, wherein the cloud-based knowledge graph service: receives compliant data clumps from the integration platform; and populates the knowledge graph in the distributed in-memory associative array with the entity, link, and attribute data in each data clump; retrieving the populated knowledge graph from the knowledge graph service and updating the distributed in-memory associative array with the populated knowledge graph; receiving a query, the query comprising an operation to be performed on the knowledge graph; performing the operation requested by the query on the knowledge graph in the distributed in-memory associative array; and returning a result of the query.

According to an aspect of an embodiment, the integration platform uses a cloud-based non-volatile storage service which is configured to back up the in-memory associative array.

According to an aspect of an embodiment, a cloud-based indexing search engine service is used and is configured to index the contents of the knowledge graph to accelerate searching.

According to an aspect of an embodiment, a cloud-based graph crawler service is used and is configured to: receive the query; traverse the knowledge graph to find the information requested in the query; and return the information found.

According to an aspect of an embodiment, a customer access portal is used to allow remote access to the system by customers.

According to an aspect of an embodiment, the integration platform, the distributed in-memory associative array and the cloud-based knowledge graph service are instantiated as services in a containerized service management application.

According to an aspect of an embodiment, separate copies of the integration platform, the distributed in-memory associative array, and the cloud-based knowledge graph service are instantiated for each client as services in a containerized service management application.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
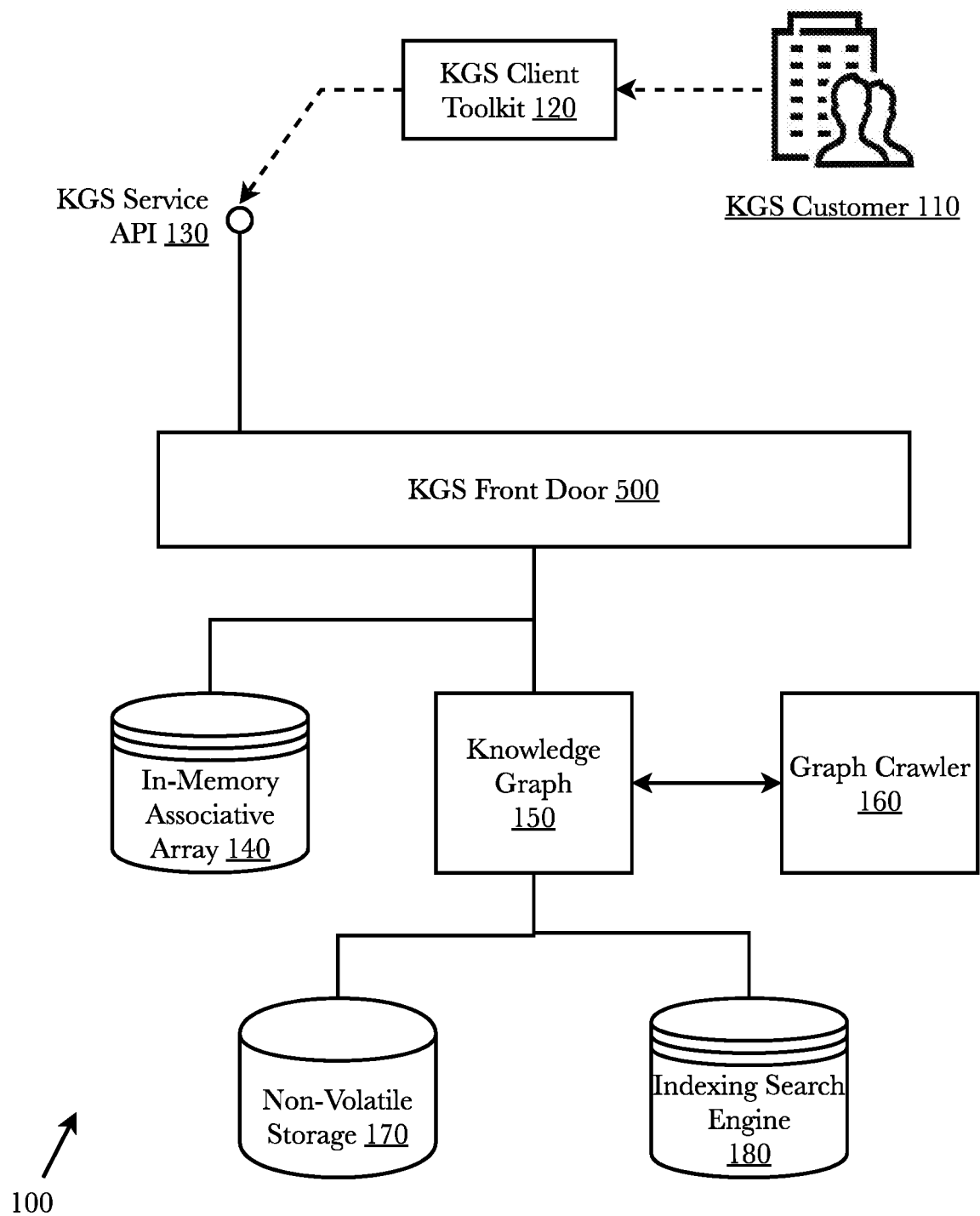
FIG. 1 is a block diagram showing an exemplary embodiment of a system for multi-tenant graph databases with dynamic specification and enforcement of ontological data models.

The inventor has conceived, and reduced to practice, a system and method for a high-performance, scalable, multi-tenant, dynamically specifiable, knowledge graph based information storage and utilization. The system uses an in-memory associative array for high-performance graph storage and access, with a non-volatile distributed database for scalable backup storage, a scalable, distributed graph service for graph creation, an indexing search engine to increase searching performance, and a graph crawler for graph traversal. One or more of these components may be in the form of a cloud-based service, and in some embodiments the cloud-based services may be containerized to allow for multi-tenant co-existence with no possibility of data leakage or cross-over.

As the field of knowledge engineering grows, there has been an increased focus on the use of ontologies to classify information. A number of ontological databases exist, most related to a particular field of application (e.g., medicine, scientific information retrieval, business organization, etc.). Existing ontologies are manually created, which is a labor-intensive and time consuming process, and limits the scope of each ontology. Merging of ontologies is also a manual process, limiting the creating of broader ontologies that represent most or all of human knowledge.

Knowledge graphs, which use defined ontologies to improve search accuracy, efficiency, and relevance, are on the rise. The use of ontologies and taxonomies is central to increasingly generalized search capabilities to capture human knowledge across a diverse set of domains, languages, and even dialects. The need for ontologies stems from the fact that human language, as opposed to machine specifications, can be ambiguous, non-literal, and redundant. When presented with a search, a service must determine not only that something is an entity, but what type and in what context. Most types of queries remain dependent on syntactic vs semantic search characteristics.

It is increasingly the case that the data of organizations (businesses, governments, etc.) is exceeding the ability of those organizations to classify, store, search, manage, and utilize the data. There is so much information available even in mid-sized organizations that much data becomes lost, inaccessible, or simply stored away with no effective means of utilizing it. This inability to utilize such large datasets within an organization represents an enormous lost potential. Knowledge graphs represent a potential means organizing this mass of data and making it accessible and usable by automating processing of semantic information, but no system or method exists which incorporates all of the elements necessary to make the process practical for a given organization, much less providing a high-performance, scalable system suitable for providing such a service to multiple clients simultaneously.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Domain-specific ontology" refers to a hierarchal taxonomy of concepts and their relationships within a particular ontological domain (i.e., a set of reference ideas that establishes context). For example, the word "card" has many different meanings, depending on the ontological domain (context) in which it is used. In the domain of poker, the term "card" would refer to a "playing card" as used in playing the game of poker. In the domain of computer software, the term "card" may refer to the antiquated "punch card" form of information storage. In the domain of computer hardware, the term "card" could refer to a "video card", an "SD card" (a type of memory storage device), or similar pieces of hardware.

"Knowledge graph stack" or "KGS" is used as shorthand to refer to a system for multi-tenant graph databases with dynamic specification and enforcement of ontological data models, although other terms such as system, method, methodology, etc., may be used.

"Ontology" refers to a formal naming and definition of the types, properties, and interrelationships of the entities that exist in a particular domain of discourse. Ontologies are a method of classification of things and their relationships with other things. They are related to, but more flexible than, taxonomies, hierarchies, and class definitions given that relationships between concept entities can be specified. The term ontologies, as used herein, has the meaning associated with information and computer science, rather than the definition used in philosophy of classifying things as they exist in reality.

Conceptual Architecture

FIG. 1 is a block diagram showing an exemplary embodiment 100 of a system for multi-tenant graph databases with dynamic specification and enforcement of ontological data models. In this embodiment, the system comprises a knowledge graph stack (KGS) client toolkit 120, a KGS service API 130 (i.e., a customer access portal or client access portal), a KGS front door 500, an in-memory associative array 140, a knowledge graph 150, a graph crawler 160, a non-volatile storage medium 170, and an indexing search engine 180. A KGS customer 110 uses the provided KGS client toolkit 120 to develop an ontological schema for classification of data and to utilize the KGS system 100.

Access to the system is made through a KGS service API 130, which interacts with the KGS front door 500 through a pre-defined messaging protocol. The messaging protocol defines a (possibly proprietary) set of messages being exchanged over the network between KGS customers 110 and the KGS system 100. Messages may be split into command messages (e.g., MakeBowl, UploadSchema, IngestClump, etc.) and event messages (e.g., BowlMade, SchemaUploaded, ClumpIngested, etc.). The messaging protocol further defines how the KGS messages can be transported over the network (by using which envelopes). Examples of popular Internet protocols which can be used to transport KGS messages are: raw TCP, HTTP/TLS, Kafka, protobuffers, AMQP, etc.

The KGS client toolkit 120 is a software package provided to KGS customers 110 to facilitate their usage of the KGS system 100. The KGS client toolkit 120 provides the means for KGS customers 110 to access and use the KGS system 100, and may contain either a command line interface or a graphical user interface, and further may contain client libraries in popular programming languages to facilitate programming client-specific applications for utilizing the KGS system 100.

The KGS front door 500 (which may also be described as an integration platform or coordination platform) acts as the gateway to the system, and coordinates the operation and interaction of the various components of the KGS system 100. Communication between the KGS client toolkit 120 and the KGS service API may be configured as a point-to-point connection, wherein the KGS client toolkit 120 connects directly to the KGS front door 500 at the KGS service API 130, or as a hub-and-spoke connection, wherein the KGS client toolkit 130 connects intermediary brokers (e.g. Kafka brokers). Other communication patterns are possible.

The in-memory associative array 140 provides a high-performance means of database storage and access. In effect, it acts simultaneously as data storage and a data cache, such that data is instantly available without having to read it from non-volatile storage such as a hard drive. Data from an in-memory associative array 140 is backed up to non-volatile storage, but is always accessed in-memory during usage. The in-memory associative array 140 is used to store in memory the knowledge graph of the KGS system as key-value pairs. This allows for high-speed manipulation of the knowledge graph, especially for very large graphs. An example of an in-memory associative array 140 implementation is Redis which is open source, in-memory data structure store, that can be used as a database, cache and message broker. An implementation like Redis can be configured to store in memory the knowledge graph of the KGS system as key-value pairs, as noted above.

The knowledge graph 150 is a graph abstract data type containing vertices (sometimes called nodes) and edges between the vertices. The vertices in a graph represent pieces of information and the edges between the vertices represent relationships between the pieces of information. The edges of a graph may have directionality, such that relationships between certain vertices are uni-directional, and may have a numerical weight, which can represent the strength or probability of a relationship between vertices. In a knowledge graph 150, the relationships are structured based on ontological relationships, rather than taxonomies or hierarchies. For scalability purposes, a distributed cloud-based knowledge graph implementation is useful. An example of such an implementation is JanusGraph, a distributed, open source, massively scalable graph database. A service like JanusGraph can be configured to operate as the knowledge graph 150 of the KGS system.

The non-volatile storage 170 stores the knowledge graph 150 and a backup of its in-memory associative array 140 implementation. For scalability purposes, some form of distributed non-volatile storage 170 is useful. An example of such an implementation is Cassandra, a distributed, open source, scalable database. An implementation like Cassandra can be configured to operate as the non-volatile storage 170 of the KGS system.

An indexing search engine 180 is used to index and search the knowledge graph 150. For scalability purposes, a distributed, scalable indexing search engine 180 is useful. An example of such an implementation is Elasticsearch, a distributed, scalable search engine that provides near real-time search capabilities. An indexing search engine indexing search engine 180 like Elasticsearch can be configured to operate as the indexing search engine 180 of the KGS system.

A graph crawler 160 may be used to traverse and query the knowledge graph 150. A graph traversal language such as Gremlin can be used to automatically implement efficient graph traversal strategies.

Figure 2:
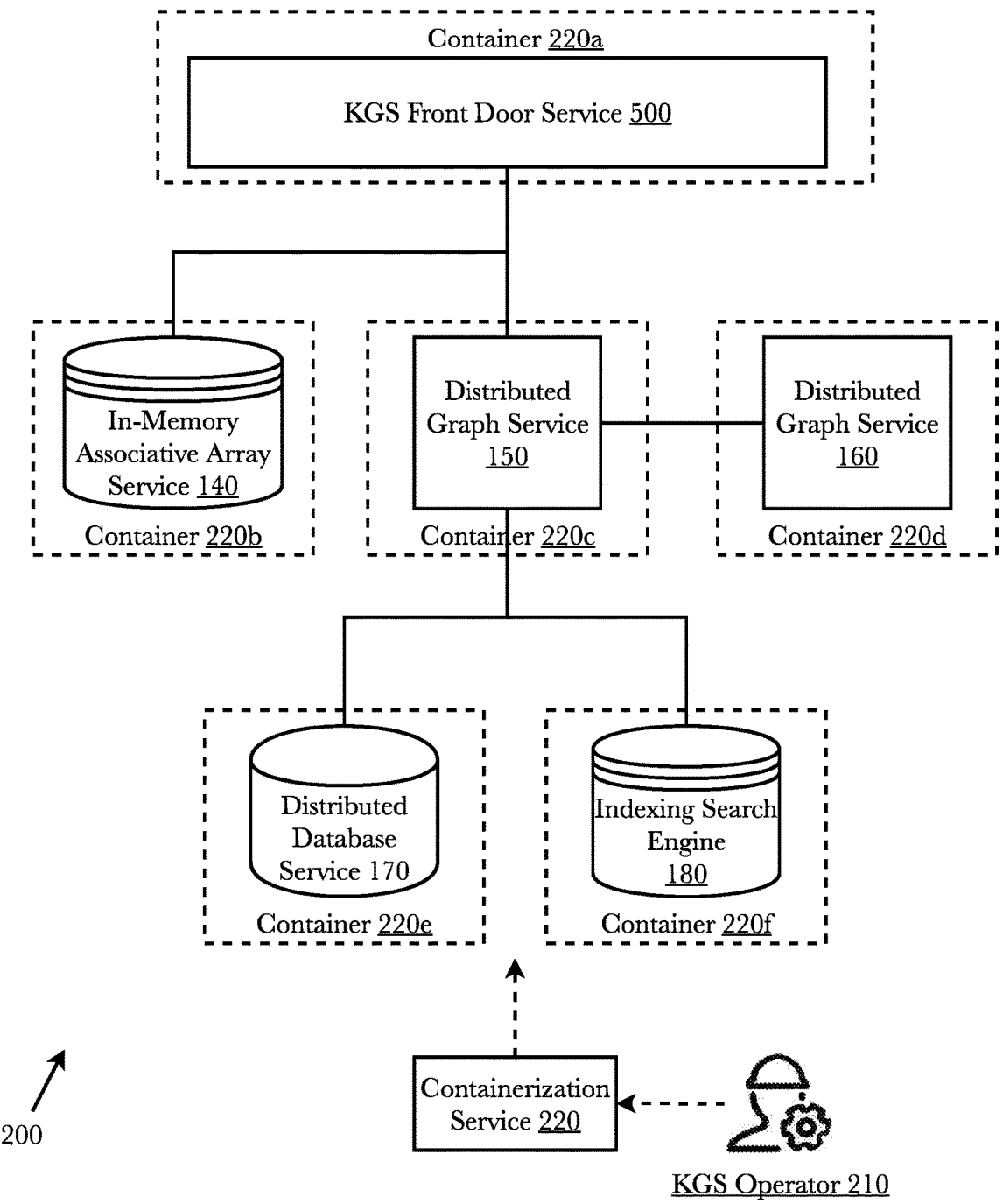
FIG. 2 is a block diagram showing another exemplary embodiment of a system for multi-tenant graph databases with dynamic specification and enforcement of ontological data models wherein each of the components is a containerized service.

FIG. 2 is a block diagram showing another exemplary embodiment 200 of a system for multi-tenant graph databases with dynamic specification and enforcement of ontological data models wherein each of the components is a containerized service. In a particularly useful embodiment, each of the components of the system is instantiated as a containerized service, all of which are distributed and scalable, and some of which are cloud-based services. A KGS operator 210 uses a containerization service 220 to automate the deployment, scaling, and management of the various components of the KGS system 200. Similar to the previous embodiment, the system comprises a KGS front door 230, an in-memory associative array service 240, a distributed graph service 250, a graph crawler service 260, a distributed database service 270, and an indexing search engine service 180. However, in this case, each of the services is instantiated as a containerized service 220a-f, managed by the KGS operator 210 using the containerization service 220. In this way, all of the components of the KGS system can be instantiated separately for each client to prevent any data leakage or data cross-over from using the same service for multiple clients. An example of such a containerization service 220 is Kubernetes, an open-source container-orchestration system. A containerization service 220 like Kubernetes can be configured to operate as the containerization service 220 of the KGS system.

Figure 3:
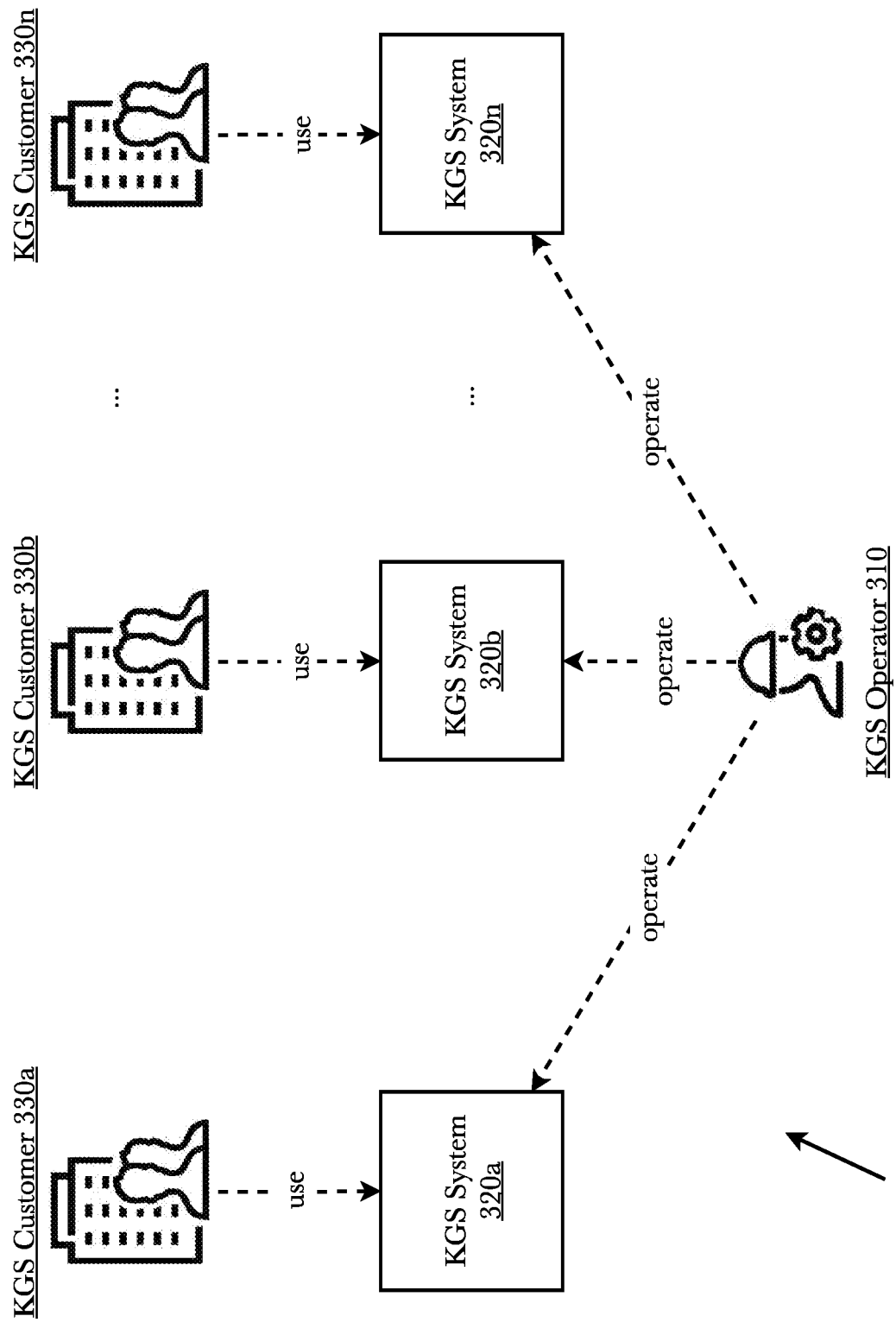
FIG. 3 is a block diagram showing instantiation and operation of separate KGS systems for each of a plurality of clients.

FIG. 3 is a block diagram showing instantiation and operation of separate KGS systems 320a-n for each of a plurality of customers 330a-n. As noted above, particularly where the components of the KGS system are containerized services, separate instances of the KGS system can be instantiated for each client 330a-n in a "shared nothing" implementation. Even where some of the services are designed to be multi-client services, such an implementation is easier to manage and better for data privacy, security, and governance, as there is no possibility of bleed-through or accidental display of data from one client 330a-n to another 330a-n.

Figure 4:
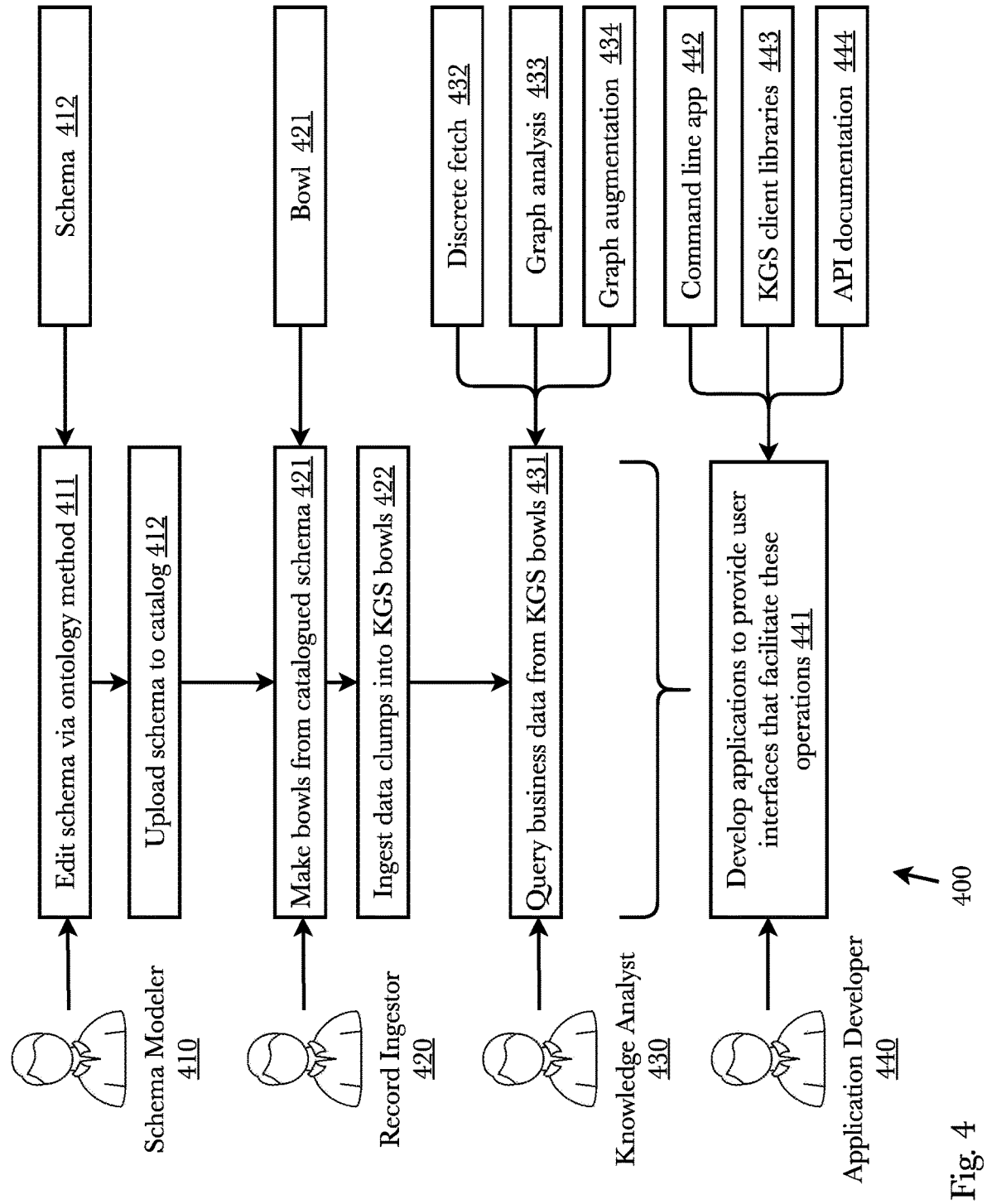
FIG. 4 is a block diagram showing the stages of setup and use of a KGS system and the roles of personnel who may use the system.

FIG. 4 is a block diagram showing the stages of setup and use of a KGS system and the roles of personnel who may use the system. In the first stage of utilization of the KGS system, a schema modeler 410 for the organization creates a schema 412 for the organization's data. A schema is an ontological representation of the organization and its data. The schema may include any information about the organization, including but not limited to, the organization's legal structure, business operational structure, personnel, data locations, data hierarchy, data sources, network structure, etc. An organization may have more than one schema. The schema defines entities, links, and attributes (ELAs), with entities being data points of interest, links being relationships between the entities, and attributes being additional descriptors that define either the entities or links. In some embodiments, the schema may be a text file, for example a resource description framework (RDF) "turtle" file (a file meeting the RDF standards and usually having a ".ttl" file extension). Once the schema is created 411, the schema modeler 410 uploads it to a schema complier, which converts the schema 412 into abstract data types, which are then stored in a catalog. The KGS client toolkit 120 contains a schema editor, which allows the schema modeler 410 to create a schema 411 using a structured interface.

In the second stage of utilization of the KGS system, a record ingestor 420 creates bowls 421 from the schema 412. A bowl 421 is a graph database, but constrained to a schema 412. When the record ingestor 420 creates a bowl 421, the KGS system creates a new (empty) knowledge graph and associates it with that schema 412. After the bowl 421 is created, the record ingestor 420 feeds data clumps into the bowl 421 for ingestion by the system and population of the knowledge graph. A KGS data clump is a block of write instructions, described using entity, link, and attribute (ELA)

records. Each instruction may specify the action to be performed on the knowledge graph (e.g., insert, update, etc.). The KGS system ingests the data clump, making sure the ELA records are validated and enforced against the schema associated with the target bowl. In some embodiments, the data clump is ingested atomically, wherein the ingestion of the data clump must either completely succeed (write all ELA records), or completely fail (with no persistent effect). This atomic ingestion of clumps provides protection against invalid data being gradually introduced into the knowledge graph.

In the third stage of utilization, the data is ready for use. A knowledge analyst 430 is able to utilize the system to provide useful information by submitting queries for business data from a KGS bowl 421. Such queries may take many forms, and a non-limiting list of such queries follows. A discrete fetch 432 may be used wherein the knowledge analyst 430 submits business-keys of interest, and the KGS bowl 421 replies with block of exactly-matching ELA records. A graph analysis may be performed, wherein the knowledge analyst 430 requests application of a known analysis algorithm to the knowledge graph, and the KGS bowl 421 returns result set in appropriate form. A graph augmentation may be performed, wherein the knowledge analyst 430 requests that calculated results be persisted in the knowledge graph, such that they are retained for future analyses.

An application developer 440 may also be employed to develop applications using the KGS client toolkit 120 to facilitate any of the above operations. The KGS client toolkit 120 may provide the application developer with a command line application 442 (or graphical user interface), KGS client libraries in popular programming languages 443 to facilitate programming client-specific applications for utilizing the KGS system, and additional resources such as API documentation 444.

Figure 5:
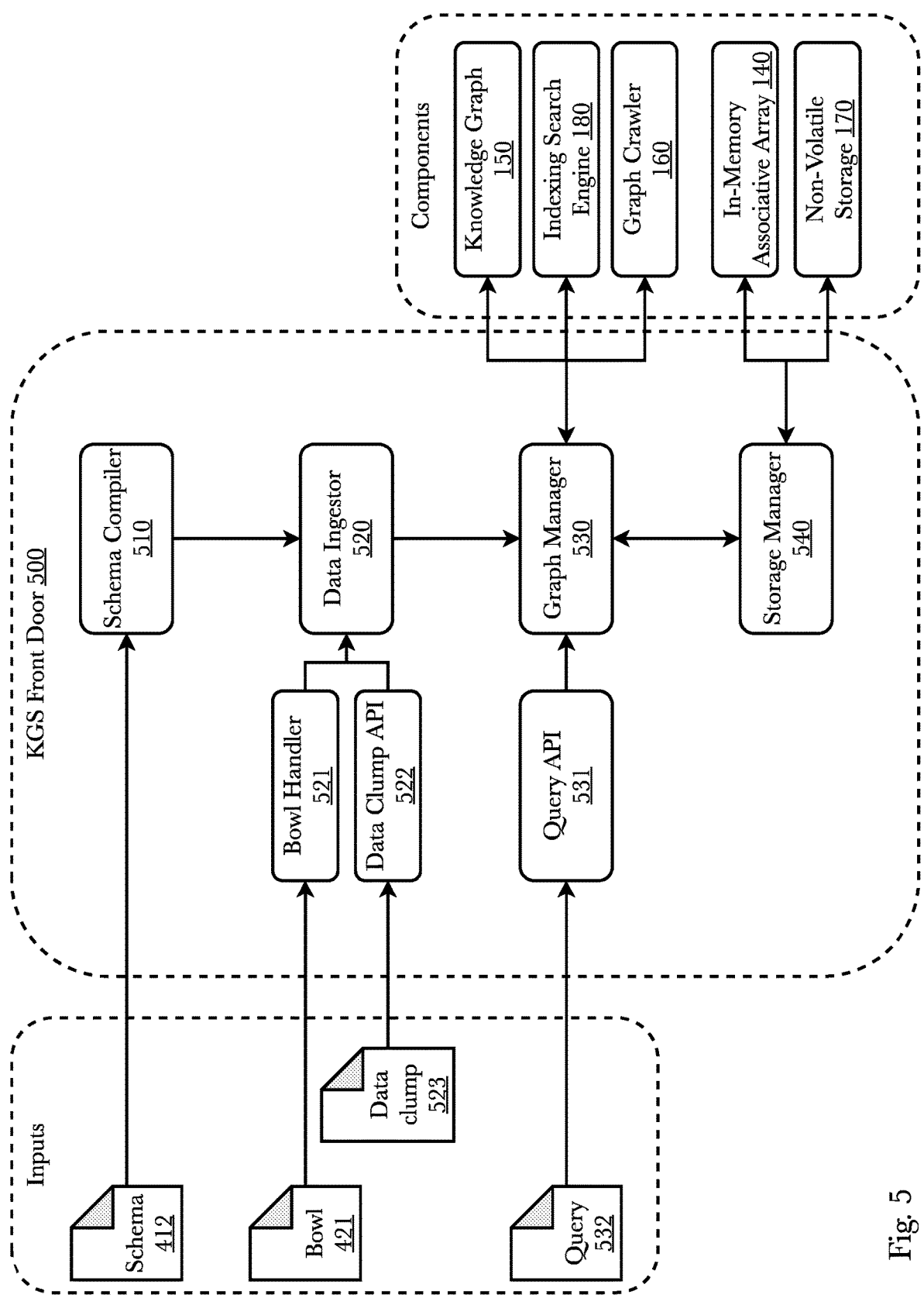
FIG. 5 is a block diagram showing additional detail regarding the KGS front door aspect of a KGS system.

FIG. 5 is a block diagram showing additional detail regarding the KGS front door 500 aspect of a KGS system. The KGS front door comprises a schema compiler 510, a data ingestor 520, a bowl handler 521, a data clump API 522, a graph manager 530, a query API 531, and a storage manager 540. Each of these components of the KGS front door 500 manages and coordinates the operation of one or more of the components that make up the KGS system 100 (which, as noted earlier, may comprise distributed, cloud-based services in some embodiments).

The schema compiler receives a schema 412, compiles the text of the schema into abstract data objects, and stores the abstract data objects associated with the schema in a catalog. The catalog (not shown) may be a database stored in the distributed database 150. The bowl handler 521 receives a bowl 421 and sends it to the data ingestor 520. The data ingestor 520 feeds the bowl 421 to the graph manager, which creates a new (empty) knowledge graph 150 for storage of data. The data clump API 522 receives data clumps 523 (e.g., of business data) fed into the system and sends them to the data ingestor 520, which ingests the data clumps 523, making sure the ELA records are validated and enforced against the schema 412 associated with the target bowl 421. In some embodiments, the data clump 523 is ingested atomically, wherein the ingestion of the data clump 523 must either completely succeed (write all ELA records), or completely fail (with no persistent effect). This atomic ingestion of data clumps 523 provides protection against invalid data being gradually introduced into the knowledge graph 150. The graph manager 530 coordinates creation of the knowledge graph 140, indexing and management of the knowledge graph 150, and queries of, and operations on, the knowledge graph 150. The graph manager 530 may use one or more distributed, cloud-based services to implement each of these functions, retaining for itself the role of coordinating the interaction of the various services. The query API 531 receives queries 532, and sends them to the graph manager 530, which then coordinates the operations on the knowledge graph 150, the indexing search engine 180, and the graph crawler 160, as necessary to implement the query 532 and return appropriate results. The storage manager coordinates the operations and interactions of the in-memory associative array 140 and the non-volatile storage 170, which are backend functions of the system not normally seen or accessed by users of the system.

Detailed Description of Exemplary Aspects

Figure 6:
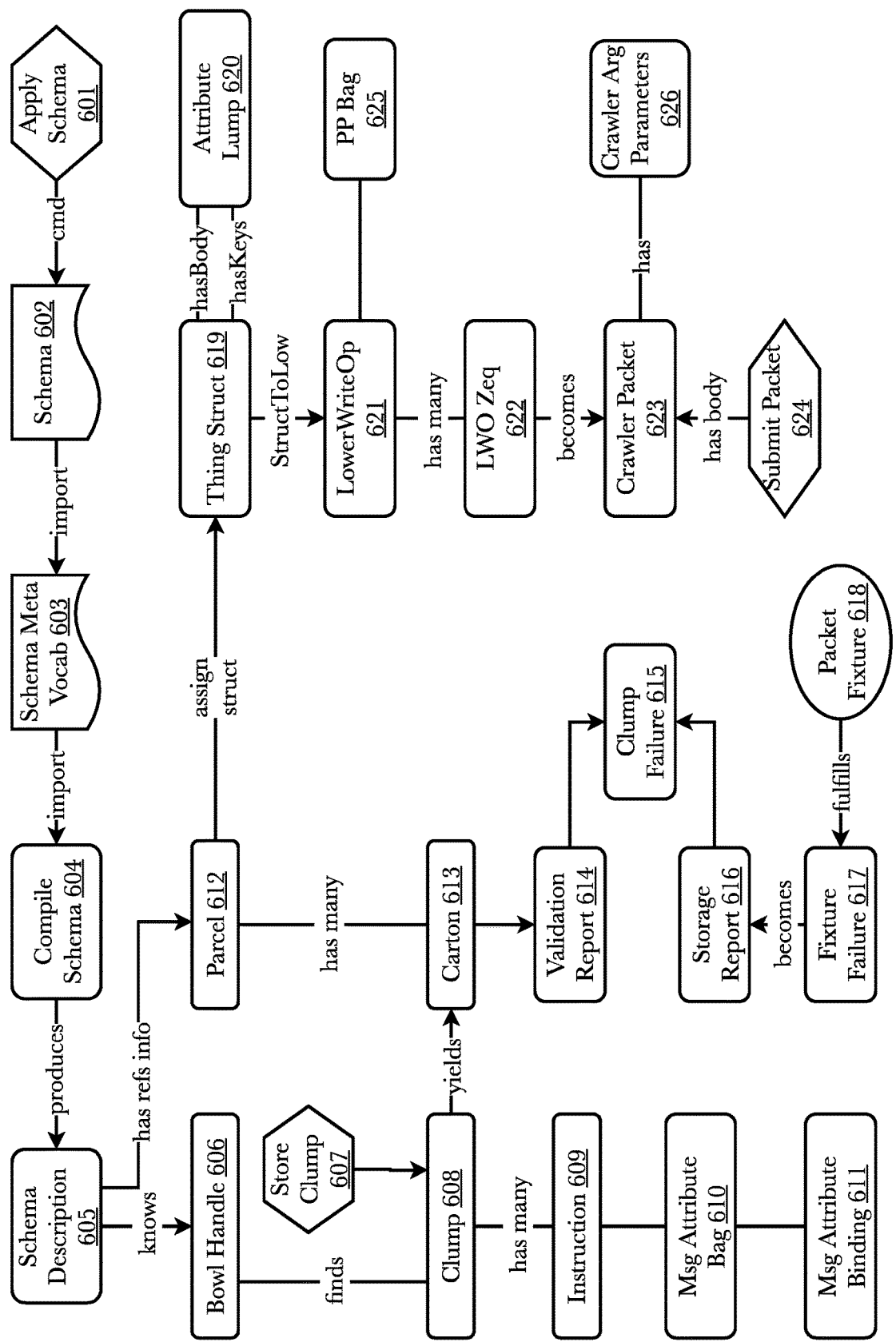
FIG. 6 is a data abstraction showing an exemplary implementation of an ontological data model for a KGS system.

FIG. 6 is a data abstraction showing an exemplary implementation of an ontological data model for a KGS system. An apply schema command 601 imports the schema 602 and any schema meta vocabulary 603 and compiles them into abstract data objects 604, which results in a schema description 605 as an output. The schema description 605 knows what bowl handles 606 are available and has reference information for parcels 612.

When a store clump command is issued 607, the bowl handle 606 finds the data clump 608 to be stored. The data clump 608 has instructions to write concrete things (entity and link data) into the knowledge graph, each thing (entity or link) having one or more message attributes 610 and message attribute bindings 611. Ingestion of the data clump 608 yields a carton 613 of data objects with schema references, the carton 613 containing one or more parcels 612. A enforcement report 614 is created for the carton 613, which will result in a clump ingestion failure 615 if the data clump 608 contains any invalid data. Another path to clump ingestion failure 615 occurs when a packet fixture 618 is submitted which results in a fixture failure 617, resulting in a storage report 616 indicating a clump ingestion failure 615.

Each parcel 612 contains instructions for creating structures from thing types (entity and link abstractions). For each parcel 612 referenced in the schema description 605, a thing structure 619 is assigned which is a navigable object in the knowledge graph, each thing structure 619 having an attribute lump 620 which is a resolved object that has keys and a body for the thing structure 619. Each thing structure 619 is incorporated into the knowledge graph structure with a lower write operation 621, each of which has one or more lower write operation sequences 622, and accesses a PP bag 625 of resolved attribute data. These lower write operation sequences 622 become crawler packets 623, each of which has crawler argument parameters, and each of which can be used to traverse the knowledge graph. A submit packet request 624 initiates the crawler packet 623 operation.

Figure 7:
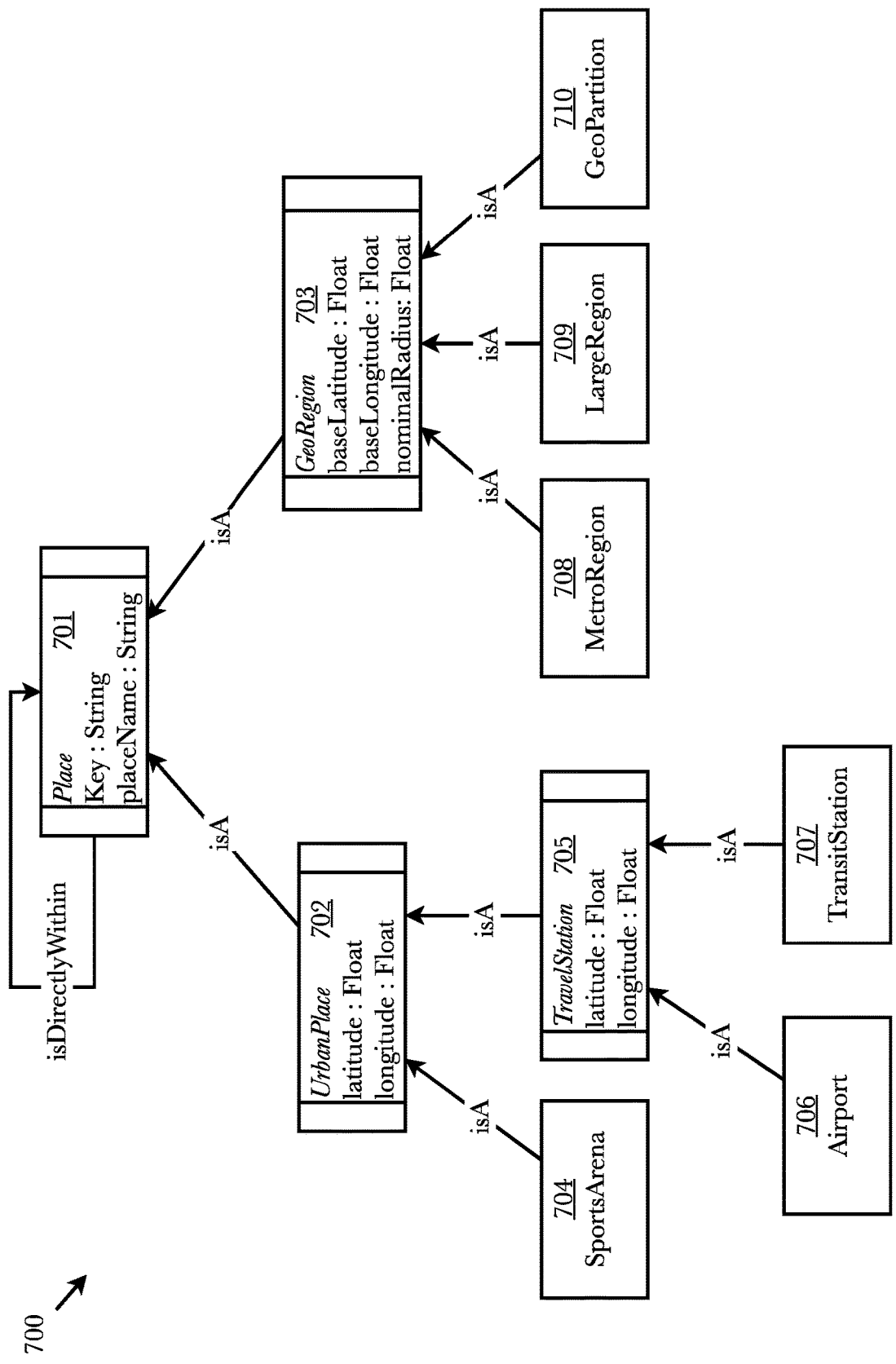
FIG. 7 is a relational diagram showing an exemplary knowledge graph abstraction.

FIG. 7 is a relational diagram showing an exemplary knowledge graph abstraction 700. As a top level, a Place abstract type 701 may contain one or more attributes such as a key and place name. Some levels of abstraction may have recursive references to themselves, as shown in the top level place abstract type 701. The place abstract type 701 in this example contains two lower level abstract types, UrbanPlace 702 representing a location within a city, town, etc. and GeoRegion 703 representing geographical regions of various sizes, both containing one or more attributes that further describe the abstraction such as latitude and longitude. UrbanPlace 702 contains a TravelStation 705 abstract type and a SportsArena 704 concrete entities (indicating a particular instance of the abstract type above it). The TravelStation abstract type 705 contains two concrete entities, an airport 706 and a transit station 707. The GeoRegion abstract type 703 contains three concrete entities, a metro region 708 (i.e., city, town, etc.), a large region (i.e., county, province, etc.), and geographical partitions (i.e., continents, subcontinents, etc.). A person of ordinary skill in the art will recognize that this is a simplified example, and that many such abstractions are possible.

Figure 8:
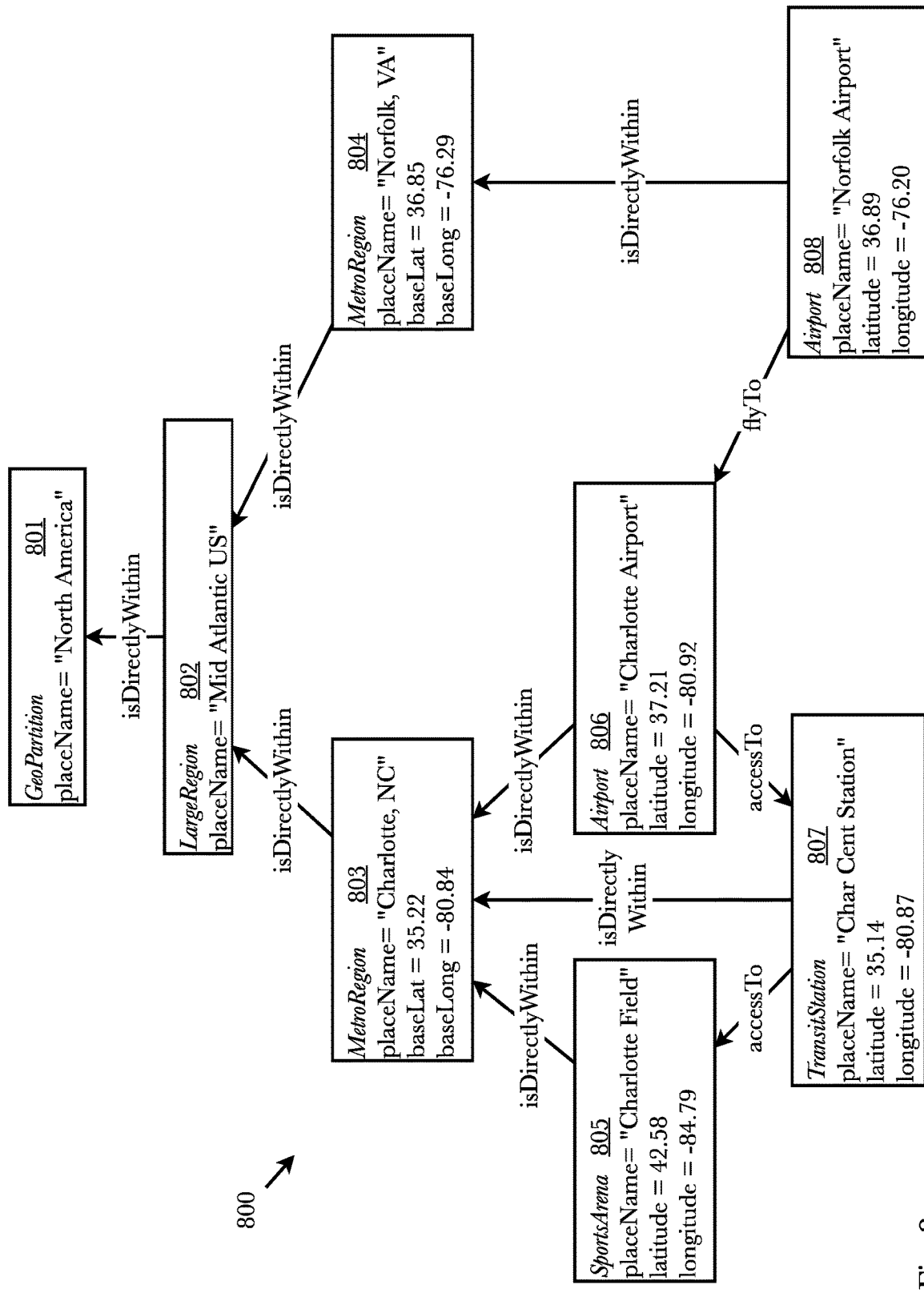
FIG. 8 is a relational diagram showing an exemplary knowledge graph implementation.

FIG. 8 is a relational diagram showing an exemplary knowledge graph implementation. In this implementation, the GeoPartition 801 is the highest level entity representing North America, with the LargeRegion 802 being contained within the GeoPartition 801, and representing the Mid-Atlantic United States. The LargeRegion 802 entity contains two metro region entities, a MetroRegion representing Charlotte, N.C. 803 and a MetroRegion representing Norfolk, Va. 804. The Charlotte Field SportsArena 805, the Charlotte Airport 806, and the Charlotte Central Station TransitStation 807 are each contained within the Charlotte, N.C. 803 entity. There is access from the Charlotte Airport 806 to Charlotte Field 805 via Charlotte Central Station 807. The Norfolk Airport entity 808 is contained within the Norfolk, Va. entity 804, and contains a transit link (via air travel) to the Charlotte Airport 806. In this simplified knowledge graph, traversals of the graph provide information about relative locations of, and transit connectivity between, various regions and locations. A person of ordinary skill in the art will recognize that this is a simplified example, and that many such implementations are possible.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
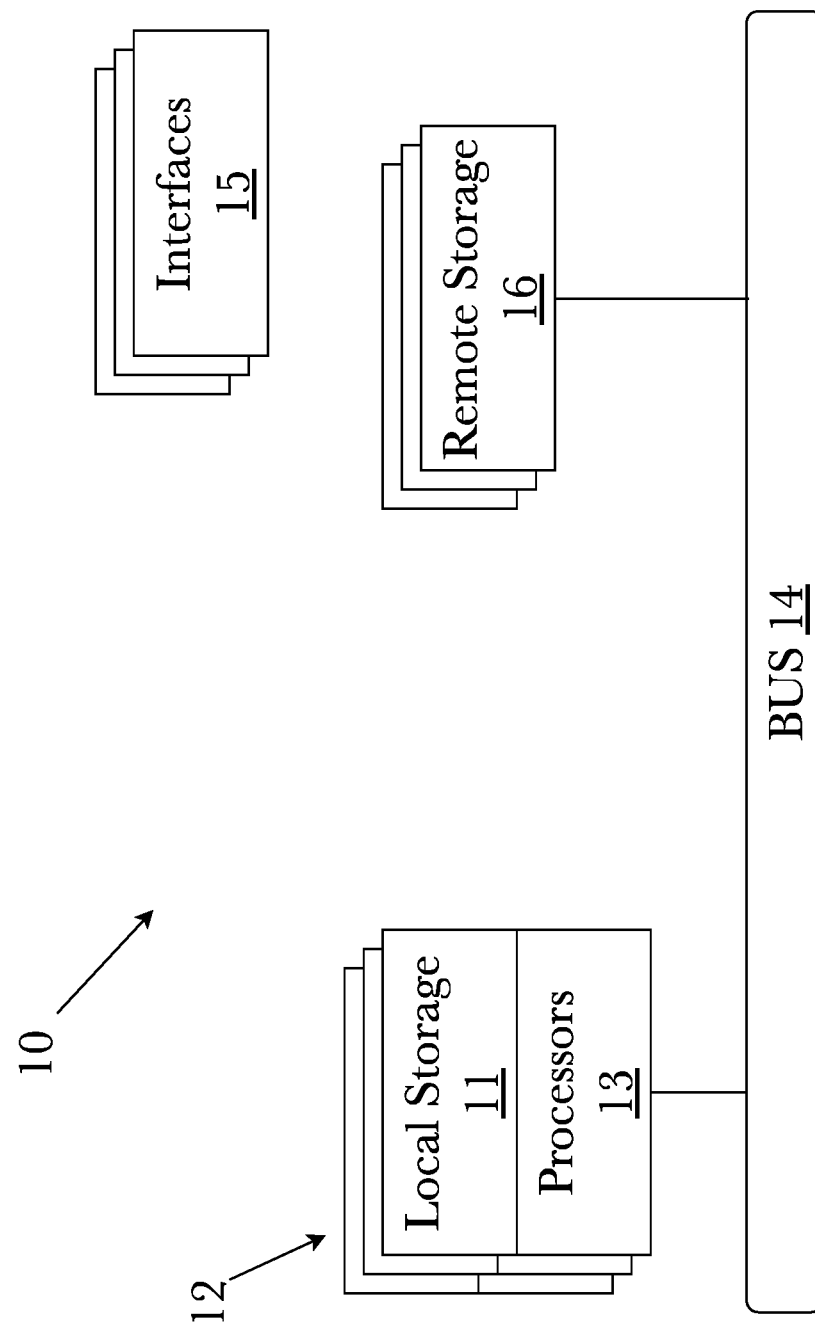
FIG. 9 is a block diagram illustrating an exemplary hardware architecture of a computing device used in various embodiments of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
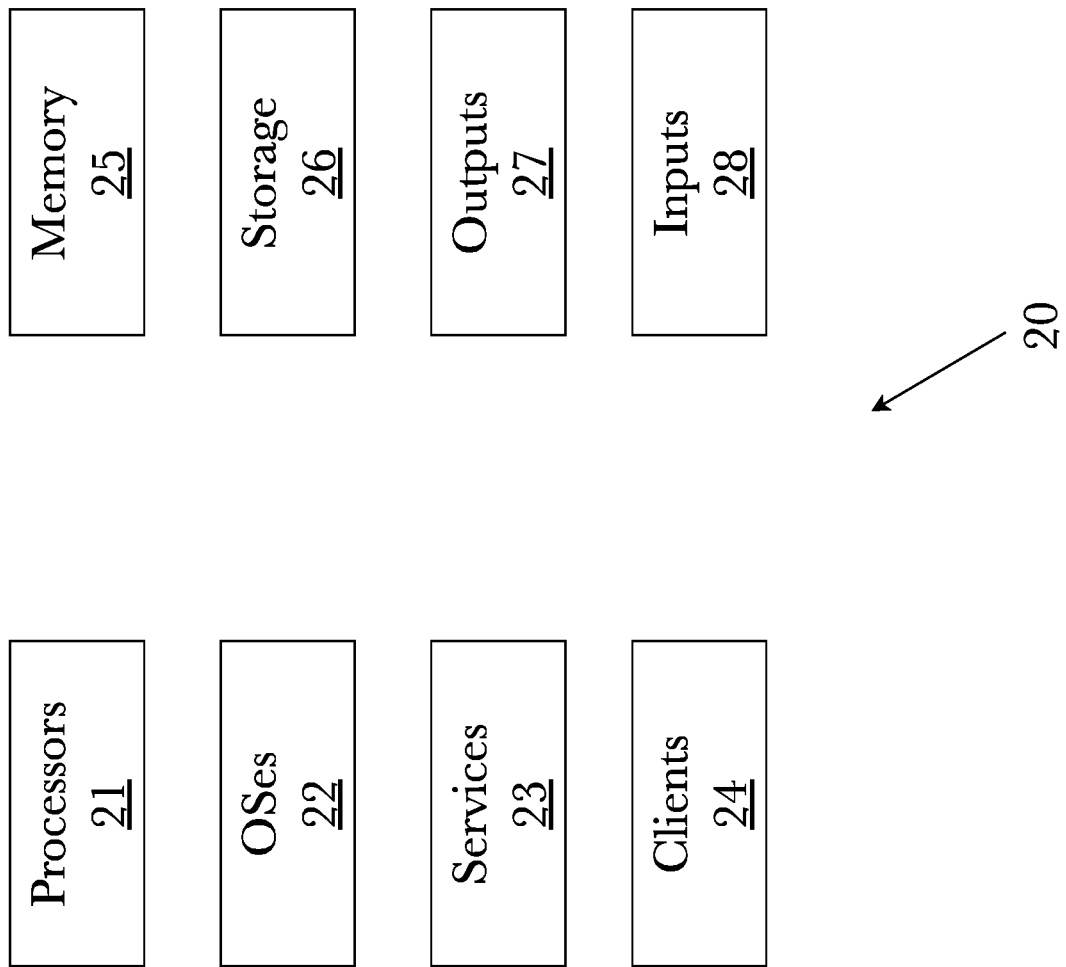
FIG. 10 is a block diagram illustrating an exemplary logical architecture for a client device, according to various embodiments of the invention.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
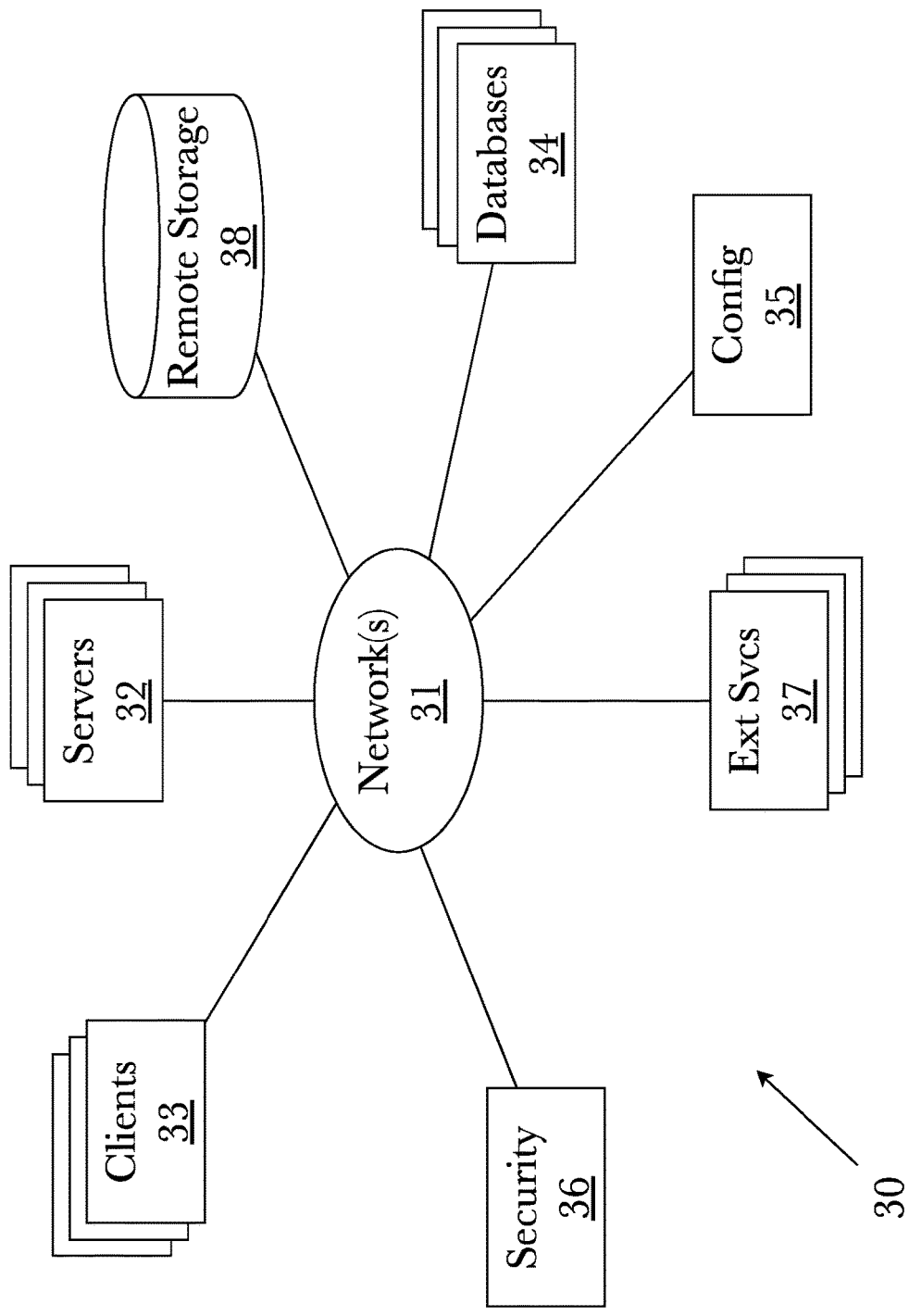
FIG. 11 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33.

Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
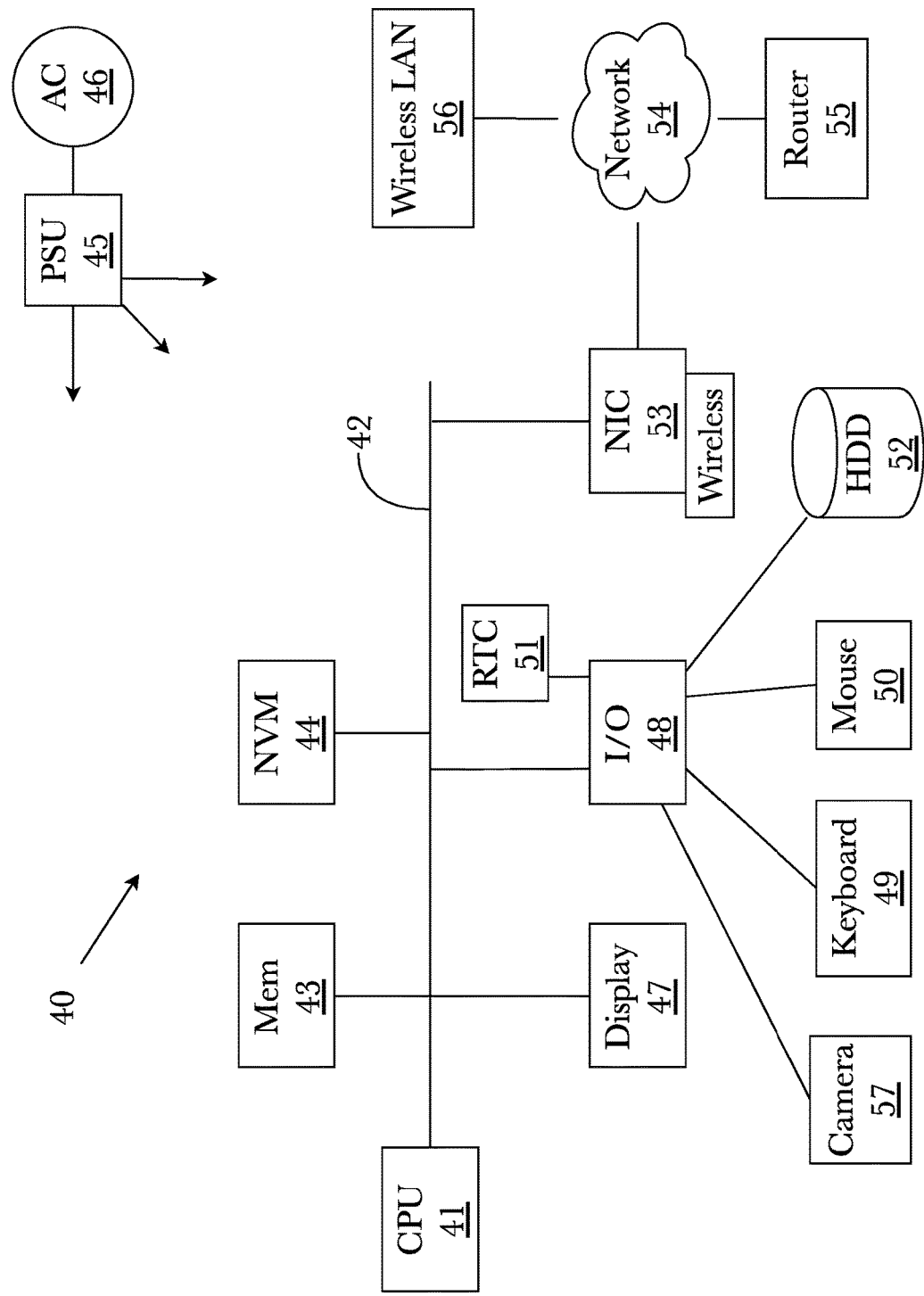
FIG. 12 is another block diagram illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for system for high-performance, dynamically specifiable, knowledge graph based information storage and utilization, comprising:
  a computing device comprising a processor and a memory;
  an in-memory associative array comprising key-value pairs stored in the memory of the computing device and configured to represent a hierarchical knowledge graph;
  an integration platform comprising a first plurality of programming instructions stored in the memory of, and operating on the processor of, the computing device, wherein the first plurality of programming instructions, when operating on the processor, cause the computing device to:
    receive a schema, the schema comprising an ontological abstraction of data;
    compile the schema into data types, each data type comprising an entity definition, one or more link definitions, and one or more attribute definitions;
    send the compiled schema to a knowledge graph engine;

receive one or more data clumps, each data clump comprising entity, link, and attribute data;
determine whether each data clump complies with the schema;
enforce compliance of each data clump by atomically accepting compliant data clumps and atomically rejecting non-compliant data clumps;
send the compliant data clumps to the knowledge graph engine for assembly into a new hierarchical knowledge graph that is created to be fully compliant with the schema;
receive a query, the query comprising an operation to be performed on the hierarchical knowledge graph;
perform the operation requested by the query; and
return a result of the query;
the knowledge graph engine comprising a second plurality of programming instructions stored in the memory of, and operating on the processor of, the computing device, wherein the second plurality of programming instructions, when operating on the processor, cause the computing device to:
receive a compiled schema from an the integration platform;
instantiate a the hierarchical knowledge graph in the in-memory associative array;
receive data clumps from the integration platform wherein the data clumps are known to be fully compliant with the schema; and
populate the hierarchical knowledge graph in the in-memory associative array with the entity, link, and attribute data in each fully-compliant data clump.

2. The system of claim 1, further comprising non-volatile storage which is configured to back up the in-memory associative array.

3. The system of claim 1, further comprising an indexing search engine comprising a third plurality of programming instructions stored in the memory of, and operating on the processor of, the computing device, wherein the third plurality of programming instructions, when operating on the processor, cause the computing device to index the contents of the hierarchical knowledge graph to accelerate searching.

4. The system of claim 1, further comprising a graph crawler comprising a fourth plurality of programming instructions stored in the memory of, and operating on the processor of, the computing device, wherein the fourth plurality of programming instructions, when operating on the processor, cause the computing device to:
receive the query;
traverse the hierarchical knowledge graph to find the information requested in the query; and
return the information found.

5. The system of claim 1, further comprising a customer access portal comprising a fifth plurality of programming instructions stored in the memory of, and operating on the processor of, the computing device, wherein the firth plurality of programming instructions, when operating on the processor, cause the computing device to allow remote access to the system by customers.

6. A system for system for high-performance, scalable, multi-tenant, dynamically specifiable, knowledge graph based information storage and utilization, comprising:
a computing device comprising a processor and a memory;
a distributed in-memory associative array comprising key-value pairs stored in the memory of a plurality of networked computing devices and configured to represent a hierarchical knowledge graph;
an integration platform comprising a first plurality of programming instructions stored in the memory of, and operating on the processor of, the computing device, wherein the first plurality of programming instructions, when operating on the processor, cause the computing device to:
receive a schema, the schema comprising an ontological abstraction of data;
compile the schema into data types, each data type comprising an entity definition, one or more link definitions, and one or more attribute definitions;
send the compiled schema to a cloud-based knowledge graph service, wherein the cloud-based knowledge graph service:
receives the compiled schema from an integration platform;
instantiates a hierarchical knowledge graph;
retrieve the hierarchical knowledge graph from the knowledge graph service and implement the hierarchical knowledge graph in the distributed in-memory associative array;
receive one or more data clumps, each data clump comprising entity, link, and attribute data;
determine whether each data clump complies with the schema;
enforce compliance of each data clump by atomically accepting compliant data clumps and atomically rejecting non-compliant data clumps;
send each compliant data clump to the cloud-based knowledge graph service engine for assembly into a new hierarchical knowledge graph that is created to be fully compliant with the schema, wherein the cloud-based knowledge graph service:
receives data clumps from the integration platform wherein the data clumps are known to be fully compliant with the schema; and
populates the hierarchical knowledge graph in the distributed in-memory associative array with the entity, link, and attribute data in each fully-compliant data clump;
retrieve the populated hierarchical knowledge graph from the knowledge graph service and update the distributed in-memory associative array with the populated knowledge graph;
receive a query, the query comprising an operation to be performed on the hierarchical knowledge graph;
perform the operation requested by the query on the hierarchical knowledge graph in the distributed in-memory associative array; and
return a result of the query.

7. The system of claim 6, wherein the integration platform uses a cloud-based non-volatile storage service which is configured to back up the in-memory associative array.

8. The system of claim 6, wherein the integration platform uses a cloud- based indexing search engine service which is configured to index the contents of the hierarchical knowledge graph to accelerate searching.

9. The system of claim 6, wherein the integration platform uses a cloud-based graph crawler service which is configured to:
receive the query;
traverse the hierarchical knowledge graph to find the information requested in the query; and
return the information found.

10. The system of claim 6, further comprising a customer access portal comprising a second plurality of programming instructions stored in the memory of, and operating on the processor of, the computing device, wherein the second plurality of programming instructions, when operating on the processor, cause the computing device to allow remote access to the system by customers.

11. The system of claim 6, wherein the integration platform, the distributed in-memory associative array, and the cloud-based knowledge graph service are instantiated as services in a containerized service management application.

12. The system of claim 11, wherein separate copies of the integration platform, the distributed in-memory associative array, and the cloud-based knowledge graph service are instantiated for each client as services in a containerized service management application.

13. A method for system for high-performance, scalable, multi-tenant, dynamically specifiable, knowledge graph based information storage and utilization, comprising the steps of:

instantiating a distributed in-memory associative array comprising key-value pairs stored in the memory of a plurality of networked computing devices and configured to represent a hierarchical knowledge graph;

receiving a schema, the schema comprising an ontological abstraction of data;

compiling the schema into data types, each data type comprising an entity definition, one or more link definitions, and one or more attribute definitions;

sending the compiled schema to a cloud-based knowledge graph service, wherein the cloud-based knowledge graph service:
 receives the compiled schema from an integration platform; and
 instantiates a hierarchical knowledge graph;

retrieving the hierarchical knowledge graph from the knowledge graph service and implementing the hierarchical knowledge graph in the distributed in-memory associative array;

receiving one or more data clumps, each data clump comprising entity, link, and attribute data;

determining whether each data clump complies with the schema;

enforcing compliance of each data clump by atomically accepting compliant data clumps and atomically rejecting non-compliant data clumps;

sending each compliant data clump to the cloud-based knowledge graph service, wherein the cloud-based knowledge graph service:
 receives compliant data clumps from the integration platform; and
 populates the hierarchical knowledge graph in the distributed in-memory associative array with the entity, link, and attribute data in each data clump;

retrieving the populated hierarchical knowledge graph from the knowledge graph service and updating the distributed in-memory associative array with the populated hierarchical knowledge graph;

receiving a query, the query comprising an operation to be performed on the hierarchical knowledge graph;

performing the operation requested by the query on the hierarchical knowledge graph in the distributed in-memory associative array; and returning a result of the query.

14. The method of claim 13, wherein the integration platform uses a cloud-based non-volatile storage service which is configured to back up the in-memory associative array.

15. The method of claim 13, wherein a cloud-based indexing search engine service is used and is configured to index the contents of the hierarchical knowledge graph to accelerate searching.

16. The method of claim 13, wherein a cloud-based graph crawler service is used and is configured to:
 receive the query;
 traverse the hierarchical knowledge graph to find the information requested in the query; and
 return the information found.

17. The method of claim 13, further comprising the step of establishing a customer access portal to allow remote access to the system by customers.

18. The method of claim 13, wherein the distributed in-memory associative array and the cloud-based knowledge graph service are instantiated as services in a containerized service management application.

19. The method of claim 18, wherein separate copies of the distributed in-memory associative array, and the cloud-based knowledge graph service are instantiated for each client as services in a containerized service management application.

* * * * *